R. V. BEHNING.
HATRACK.
APPLICATION FILED FEB. 15, 1921.

1,387,341.

Patented Aug. 9, 1921.
2 SHEETS—SHEET 1.

WITNESS:

Robert V. Behning
INVENTOR

BY Victor J. Evans
ATTORNEY

R. V. BEHNING.
HATRACK.
APPLICATION FILED FEB. 15, 1921.
1,387,341.
Patented Aug. 9, 1921.
2 SHEETS—SHEET 2.
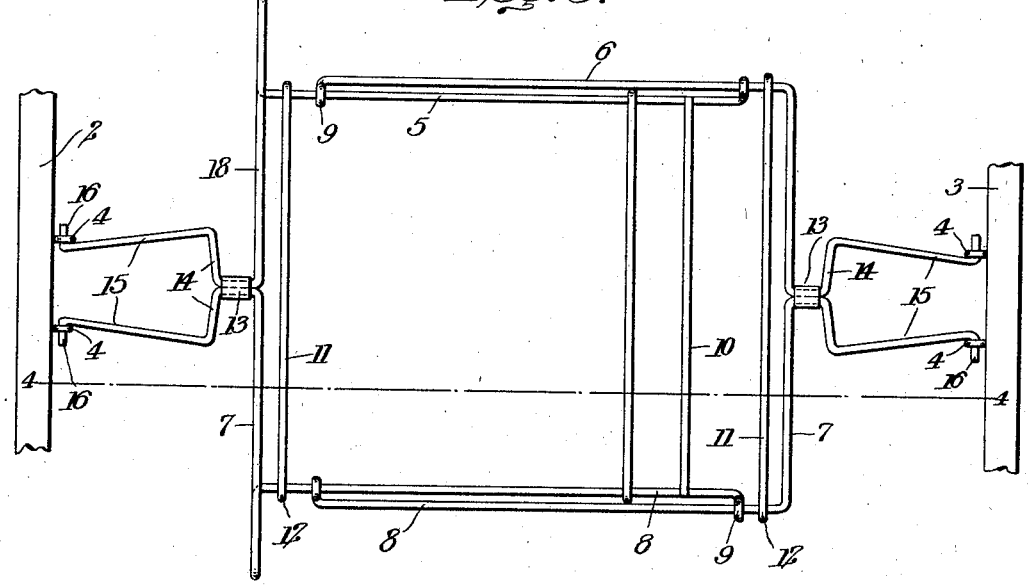
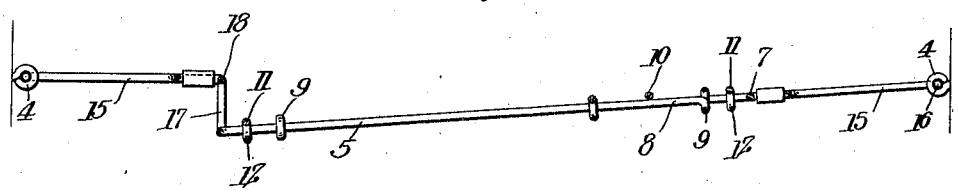
Robert V. Behning,
INVENTOR
BY Victor J. Evans
ATTORNEY
WITNESS:

UNITED STATES PATENT OFFICE.

ROBERT V. BEHNING, OF LOS ANGELES, CALIFORNIA.

HATRACK.

1,387,341.  Specification of Letters Patent.  Patented Aug. 9, 1921.

Application filed February 15, 1921. Serial No. 445,160.

*To all whom it may concern:*

Be it known that I, ROBERT V. BEHNING, a citizen of the United States, residing at Los Angeles, in the county of Los Angeles and State of California, have invented new and useful Improvements in Hatracks, of which the following is a specification.

My present invention has reference to a rack or support for hats, and other articles from the top of an automobile or like vehicle.

My primary object is to produce a device of this character which shall be supported between the bows for the cover frame of an automobile, and consequently arranged close to the top thereof, said device being supported on each of the bows in a manner to permit of the same being swung downwardly from either end thereof to arrange the article therein, and thereafter again swung toward the top and effectively secured to the bow from which it was released.

A further object is to produce a support or rack of this character which is of an adjustable nature, whereby the same may be effectively supported between the bows for the top of an automobile, regardless of the space between the bows, and wherein the supporting means permit of the device being swung downwardly from either end thereof for the arrangement of hats or the like thereon, the said supporting means permitting of the device being wholly removed should it be found desirable.

A still further object is the production of a rack or support for hats or the like from the top of an automobile, in which the device is wholly constructed of wire, that is adjustable and that has its ends provided with oppositely directed spring jaws designed to be received in eyelets in the bows for the top covering for the machine, the said jaws, when moved toward each other being released from the eyes whereby the device may be swung over the hinged support provided by the opposite jaws and eyes in a position to receive hats or similar articles, and thereafter swung to permit of the jaws again engaging the eyes, the construction being such as to permit of the same being bodily removed from the machine should occasion require, and the size of the same being such as to permit of the storage thereof in the pocket beneath the seat or at any other convenient place in the machine.

The foregoing objects, and others which will appear as the nature of the invention is better understood, may be accomplished by a construction, combination and operative arrangement of parts, such as is disclosed by the drawings which accompany and which form part of this application.

In the drawings:—

Fig. 3 is a plan view of the improvement, the dotted lines indicating the manner in which the same may be longitudinally adjusted.

Fig. 4 illustrates details.

Figure 1:
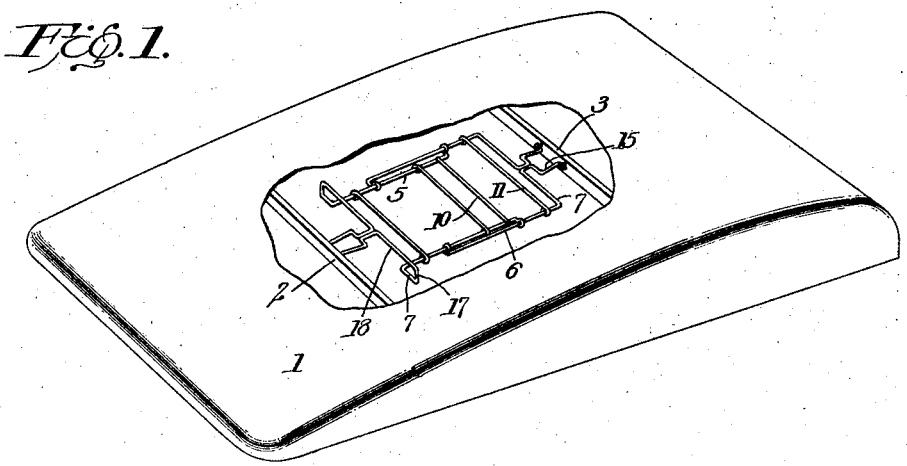
Figure 1 is a perspective view looking toward the top of an automobile having the improvement attached thereto.
Figure 2:
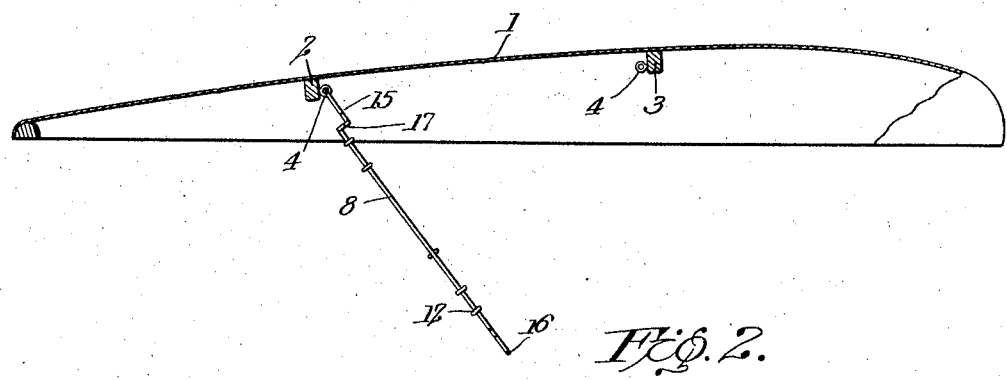
Fig. 2 is a vertical longitudinal sectional view through the top of the automobile showing the improvement swung from one of the bows thereof, as when a hat or similar article is to be arranged thereon.

The top of an automobile or similar vehicle is broadly indicated by the numeral 1, and two of the bows therefor by the numerals 2 and 3 respectively. Each of the bows has its confronting face provided with a pair of spaced eyes 4 respectively.

The improvement is primarily designed for supporting hats but may, of course, support other articles. The improvement is wholly constructed of wire which embodies an inherent resiliency and comprises essentially two substantially U-shaped members 5 and 6 respectively. The end portions of the members 5 and 6 are indicated by the numeral 7 respectively. These ends are straight and are bent upon themselves to provide the parallel side members or arms 8 respectively. The end of the member 5 is of a less length than that of the member 6, so that the arms of the said member 5 will be received between the arms of the member 6. The outer ends of the arms 8 of the respective members are bent outwardly and rounded upon themselves to provide coils 9 respectively, and these coils are arranged to receive therethrough the arms of the adjacent members 5 and 6. In this manner, the members 5 and 6 are assembled one on the other, and a transverse brace bar 10 connects the inner arms of the member 5 adjacent to the outer ends thereof, holding the said arms in proper spaced relation. The arms of the members 6 are held, adjacent to their outer ends freely spaced by the engagement of the coils thereon with the arms of the member 5. On the arms of each of the members 5 and 6 there are transversely arranged rods 11 that have their ends bent to provide coils or eyes 12 whereby the said rods are slidable on the arms of the respective members 5 and 6. These arms are employed for adjusting the space between the arms and ends of the members 5 and 6, whereby varying sizes of hat brims may be engaged and supported on the device.

Each of the members 5 and 6 has its end portion 7, at the center thereof provided with a longitudinal extension 13. Each extension has its outer end provided with oppositely extending portions 14 that in turn have their ends bent to provide arms 15 which have their ends bent outwardly to form hooks or beaks 16. The arms 15, and the beaks thereof, provide the jaws of the device, and these jaws are designed to be forced toward each other to permit of the beaks 16 thereof being received in the eyes 4 on the bows 2 and 3 of the top 1. Thus it is to be noted, that the eyes on the bows are spaced closer to each other than is the length of the lateral members 14 formed on the extensions 13, so that a sufficient spring tension will be exerted between the jaws and the said eyes to hold the device in a rigid position on the inner face of the top of the automobile.

It will be apparent that by exerting a pressure against the opposed spring jaws of either of the members 5 or 6, the same can be released from the eyes which receive the beaks thereof, so that the device, as a whole, may be swung downwardly in the machine, and the hats or other articles properly positioned on the rack. Thereafter the device is again swung to its initial position and when the beaks of the jaws have been brought opposite the eyes, pressure upon the said jaws is released permitting the beaks to again spring into the eyes. Also the device may be readily removed, should the same not be desired for use. The eyes are comparatively small and do not mar the appearance of the cover when the rack is detached therefrom.

One or both of the ends 7 are extended angularly beyond the longitudinal or side members of the U-shaped frame, and have their ends bent upwardly, as at 17 and from thence extended inwardly, as at 18. The members 18 are centrally bent upon themselves to provide the outwardly extending portions 13. By such arrangement the brim of a hat may be inserted through the spaces provided by the upper and lower portions 18 and 7 respectively, at the ends of the said U-shaped members, and the hat thus effectively supported upon the device. In this instance, however, the transverse connecting members 10 and 11 are disposed a suitable distance inward from the open ends of the U-shaped frames, being arranged inwardly of the coils 9 on the ends of the side members or arms 8 of both sections of the device. When so arranged the said members will receive thereon a portion of the rim of a hat so that the latter is effectively supported.

Having described the invention, I claim:—

1. In combination with the top of a vehicle, of a hat rack having its ends supported thereon, and means between the ends of the hat rack and the supports therefor permitting the downward swinging of the rack on its support from either end of the rack.

2. In combination with the top of a vehicle having its bows provided with alining spaced eyes, of a hat rack including a body constructed of two telescopic frames, a pair of opposed spring jaws on the end of each of the bodies, each of the said jaws having its end provided with outturned beaks designed, when the jaws are compressed toward each other to be arranged between the eyes and when released to enter said eyes.

3. In combination with the top of a vehicle having the opposed bows thereof provided with spaced eyes on the confronting faces thereof, of a hat rack for the vehicle comprising two wire substantially U-shaped frames, the side members or arms of the frames having their ends outturned and coiled to receive therein the side members of the coöperating frame, brace means between the side members of the inner frame, laterally disposed longitudinally movable rods on the side members of each of the frames, each frame having its end provided with a pair of spring jaws, the ends of which terminating in beaks, and the said jaws designed to be forced toward each other to bring the beaks in register with the eyes and when released to engage in said eyes.

4. In combination with spaced eyes arranged in pairs on the confronting faces of spaced supports, of a hat rack comprising two substantially U-shaped members having the outer ends of their arms coiled to receive therethrough the arms of the coacting member, and whereby said members are telescopically associated, the outer end of one or both of the members being extended laterally with respect to the parallel sides thereof, and from thence upwardly and inwardly, the last mentioned portions being bent outwardly at the center of the device and further bent to provide spring jaws having outturned beaks for engaging with the spaced pairs of eyes on each of the supports.

In testimony whereof I affix my signature.

ROBERT V. BEHNING.